US010879842B2

(12) United States Patent
Haynes et al.

(10) Patent No.: US 10,879,842 B2
(45) Date of Patent: Dec. 29, 2020

(54) ROOFING, CLADDING OR SIDING MODULE OR APPARATUS

(71) Applicant: Zinniatek Limited, Auckland (NZ)

(72) Inventors: Andrew Leo Haynes, Auckland (NZ); Samuel Gwynn Buckingham, Auckland (NZ)

(73) Assignee: Zinniatek Limited, Auckland (NZ)

( * ) Notice: Subject to any disclaimer, the term of this patent is extended or adjusted under 35 U.S.C. 154(b) by 0 days.

(21) Appl. No.: 16/342,055

(22) PCT Filed: Oct. 12, 2017

(86) PCT No.: PCT/IB2017/056298
§ 371 (c)(1),
(2) Date: Apr. 15, 2019

(87) PCT Pub. No.: WO2018/073698
PCT Pub. Date: Apr. 26, 2018

(65) Prior Publication Data
US 2019/0238090 A1     Aug. 1, 2019

Related U.S. Application Data

(60) Provisional application No. 62/408,986, filed on Oct. 17, 2016.

(51) Int. Cl.
*E04D 1/26*     (2006.01)
*E04D 3/365*    (2006.01)
(Continued)

(52) U.S. Cl.
CPC .............. *H02S 40/44* (2014.12); *E04D 1/24* (2013.01); *E04D 1/265* (2013.01); *E04D 1/30* (2013.01);
(Continued)

(58) Field of Classification Search
CPC .. E04D 1/24; E04D 1/265; E04D 1/26; H02S 40/44; F24S 20/67; E04F 13/074; E04F 13/00
(Continued)

(56) References Cited

U.S. PATENT DOCUMENTS 167,833 A      9/1875   Garland
510,027 A     12/1893   Johnson
(Continued)

FOREIGN PATENT DOCUMENTS

CA      2849258 A1     3/2013
CA      2794345 A1     5/2013
(Continued)

OTHER PUBLICATIONS

Written Opinion regarding International Appl. No. PCT/IB2017/056298, dated Jan. 5, 2018, 5 pps.
(Continued)

*Primary Examiner* — Paola Agudelo
(74) *Attorney, Agent, or Firm* — Foley & Lardner LLP

(57) ABSTRACT

A roofing, cladding or siding module is described. The module comprises an underlapping region adapted to be substantially covered by an exposed region of an adjacent overlapping module when installed on a building surface. A plurality of projections are formed on an underside of the underlapping region. The projections are feet to support the module on the building surface to provide a gap between the module and the building surface, and/or provide a profile on the underside of the underlapping region to define a pathway for air flow between the module and the building surface. Each projection is formed by a downwardly projecting portion of the underlapping region with a corresponding
(Continued)

US 10,879,842 B2

Page 2 cavity in an upper side of the underlapping region, and the cavity is shaped to prevent or minimize water pooling in the cavity.

27 Claims, 8 Drawing Sheets

(51) Int. Cl.
| | |
|---|---|
| E04D 13/17 | (2006.01) |
| E04D 1/24 | (2006.01) |
| H02S 40/44 | (2014.01) |
| E04F 13/00 | (2006.01) |
| F24S 20/67 | (2018.01) |
| E04F 13/08 | (2006.01) |
| E04F 13/18 | (2006.01) |
| E04D 3/02 | (2006.01) |
| H02S 20/26 | (2014.01) |
| E04D 1/30 | (2006.01) |
| E04F 13/074 | (2006.01) |
| E04F 13/24 | (2006.01) |
| E04D 1/34 | (2006.01) |

(52) U.S. Cl.
CPC ............... *E04D 3/02* (2013.01); *E04D 3/365* (2013.01); *E04D 13/17* (2013.01); *E04F 13/007* (2013.01); *E04F 13/074* (2013.01); *E04F 13/0837* (2013.01); *E04F 13/0864* (2013.01); *E04F 13/18* (2013.01); *E04F 13/24* (2013.01); *F24S 20/67* (2018.05); *H02S 20/26* (2014.12); *E04D 2001/309* (2013.01); *E04D 2001/3408* (2013.01); *Y02B 10/20* (2013.01); *Y02E 10/44* (2013.01)

(58) Field of Classification Search
USPC .......................................... 52/535, 536, 518
See application file for complete search history.

(56) References Cited

U.S. PATENT DOCUMENTS

| | | | |
|---|---|---|---|
| 734,976 A * | 7/1903 | Simmerman | E04D 1/16 52/536 |
| 1,004,338 A | 9/1911 | Austin | |
| 1,266,137 A | 5/1918 | Melde | |
| 1,634,126 A | 6/1927 | Tyra | |
| 1,678,333 A | 7/1928 | Figge | |
| 1,741,515 A | 12/1929 | Halprin | |
| 1,941,216 A | 12/1933 | McKeown | |
| 2,149,818 A | 3/1939 | North | |
| 2,260,446 A | 11/1941 | Ormsby | |
| 2,362,236 A | 11/1944 | Bassler | |
| 2,568,603 A | 9/1951 | Anthony | |
| 2,624,298 A | 1/1953 | Farren | |
| 2,680,565 A | 6/1954 | Lof | |
| 2,756,699 A | 7/1956 | Lockwood | |
| 2,766,861 A | 10/1956 | Abramson | |
| 3,058,265 A | 10/1962 | Lapsensohn | |
| 3,223,018 A | 12/1965 | Tucker | |
| 3,332,830 A | 7/1967 | Tomlinson | |
| 3,357,064 A | 12/1967 | Munse | |
| 3,661,410 A | 5/1972 | Larson et al. | |
| 4,141,182 A | 2/1979 | McMullen | |
| 4,173,243 A | 11/1979 | Wilde et al. | |
| 4,173,253 A | 11/1979 | Wiegand | |
| 4,201,196 A | 5/1980 | Zani | |
| 4,281,639 A | 8/1981 | Kuronen | |
| 4,288,959 A | 9/1981 | Murdock | |
| 4,319,437 A | 3/1982 | Murphy | |
| 4,411,117 A | 10/1983 | Bolha | |
| 4,426,823 A | 1/1984 | Kobe | |
| 4,712,351 A | 12/1987 | Kasprzak | |
| 4,956,140 A | 9/1990 | Rolles et al. | |
| 5,053,180 A | 10/1991 | Wang et al. | |
| 5,070,671 A | 12/1991 | Fifield et al. | |
| 5,076,037 A | 12/1991 | Crick et al. | |
| 5,094,058 A | 3/1992 | Slocum | |
| 5,100,274 A | 3/1992 | Hasan et al. | |
| 5,104,770 A | 4/1992 | Usifer et al. | |
| 5,295,339 A | 3/1994 | Manner | |
| 5,347,785 A | 9/1994 | Terrenzio et al. | |
| 5,437,735 A | 8/1995 | Younan et al. | |
| 5,475,963 A | 12/1995 | Chelednik | |
| 5,487,247 A | 1/1996 | Pigg | |
| 5,537,792 A * | 7/1996 | Moliere | E04F 13/0864 52/531 |
| 5,615,523 A | 4/1997 | Wells et al. | |
| 5,615,527 A * | 4/1997 | Attley | E04D 1/06 52/518 |
| 5,630,305 A | 5/1997 | Hlasnicek | |
| 5,651,226 A | 7/1997 | Archibald | |
| 5,690,876 A | 11/1997 | Gallo, Jr. | |
| 5,711,126 A | 1/1998 | Wells | |
| 5,752,355 A * | 5/1998 | Sahramaa | E04D 1/18 52/539 |
| 6,021,611 A | 2/2000 | Wells et al. | |
| 6,061,978 A | 5/2000 | Dinwoodie et al. | |
| 6,145,264 A | 11/2000 | Dallaire | |
| 6,164,034 A | 12/2000 | Roetheli et al. | |
| 6,178,703 B1 * | 1/2001 | Noone | E04D 1/16 52/100 |
| 6,201,179 B1 | 3/2001 | Dalacu | |
| 6,220,956 B1 | 4/2001 | Kilian et al. | |
| 6,248,271 B1 | 6/2001 | Graham et al. | |
| 6,856,496 B1 | 2/2005 | Mucci et al. | |
| 6,908,295 B2 | 6/2005 | Thielman et al. | |
| 6,941,706 B2 | 9/2005 | Austin et al. | |
| 7,520,098 B1 | 4/2009 | Martinique et al. | |
| 7,735,287 B2 | 6/2010 | Gaudreau | |
| 8,020,353 B2 | 9/2011 | Gaudreau | |
| 8,100,341 B1 | 1/2012 | Roderick et al. | |
| 8,215,070 B2 | 7/2012 | Railkar et al. | |
| 8,245,475 B1 | 8/2012 | Thomson et al. | |
| 8,307,599 B2 | 11/2012 | Jenkins et al. | |
| 8,333,356 B2 | 12/2012 | Ernst et al. | |
| 8,402,707 B2 | 3/2013 | Mitchell et al. | |
| 8,468,754 B2 | 6/2013 | Railkar et al. | |
| 8,567,601 B2 | 10/2013 | Turek et al. | |
| 8,713,860 B2 | 5/2014 | Railkar et al. | |
| 8,713,882 B2 | 5/2014 | Kalkanoglu et al. | |
| 8,763,339 B2 | 7/2014 | Bryson et al. | |
| 8,782,967 B2 | 7/2014 | Daniels | |
| 9,182,136 B2 | 11/2015 | Oaten et al. | |
| 9,322,173 B2 | 4/2016 | Pisani | |
| 9,416,540 B2 | 8/2016 | Allen et al. | |
| 9,518,391 B2 * | 12/2016 | Haynes | E04D 13/00 |
| 2001/0022055 A1 | 9/2001 | Zhang | |
| 2002/0037630 A1 | 3/2002 | Agarwal et al. | |
| 2002/0117166 A1 | 8/2002 | Okumura | |
| 2003/0154667 A1 | 8/2003 | Dinwoodie | |
| 2004/0009338 A1 | 1/2004 | Jo et al. | |
| 2004/0020528 A1 | 2/2004 | Patwardhan | |
| 2004/0074156 A1 | 4/2004 | Haynes | |
| 2005/0026297 A1 | 2/2005 | Daniely et al. | |
| 2005/0072091 A1 | 4/2005 | Morris | |
| 2005/0072092 A1 * | 4/2005 | Williams | E04D 1/22 52/518 |
| 2005/0178429 A1 | 8/2005 | McCaskill et al. | |
| 2005/0210806 A1 * | 9/2005 | Guerra | E04D 1/22 52/518 |
| 2005/0239394 A1 | 10/2005 | O'Hagin et al. | |
| 2005/0262797 A1 | 12/2005 | Davis | |
| 2006/0026908 A1 | 2/2006 | Gregori et al. | |
| 2006/0080942 A1 | 4/2006 | O'Neill | |
| 2007/0039274 A1 | 2/2007 | Harrington et al. | |
| 2007/0078191 A1 | 4/2007 | Guhde et al. | |
| 2007/0119109 A1 | 5/2007 | Kuelker | |
| 2007/0144096 A1 | 6/2007 | O'Neal | |
| 2007/0193620 A1 | 8/2007 | Hines et al. | |
| 2007/0266562 A1 | 11/2007 | Friedman et al. | |
| 2008/0000174 A1 | 1/2008 | Flaherty et al. | |

(56) References Cited

U.S. PATENT DOCUMENTS

| | | |
|---|---|---|
| 2008/0000512 A1 | 1/2008 | Flaherty et al. |
| 2008/0121270 A1 | 5/2008 | Mayer et al. |
| 2008/0184645 A1 | 8/2008 | Trabue et al. |
| 2008/0185748 A1 | 8/2008 | Kalkanoglu |
| 2008/0271773 A1 | 11/2008 | Jacobs et al. |
| 2008/0302030 A1 | 12/2008 | Stancel et al. |
| 2008/0302031 A1 | 12/2008 | Bressler et al. |
| 2009/0000222 A1 | 1/2009 | Kalkanoglu et al. |
| 2009/0215304 A1 | 8/2009 | Faust et al. |
| 2010/0037548 A1 | 2/2010 | Kalkanoglu et al. |
| 2010/0083602 A1 | 4/2010 | Pollack |
| 2010/0141042 A1 | 6/2010 | Kesler et al. |
| 2010/0170169 A1 | 7/2010 | Railkar et al. |
| 2010/0236162 A1 | 9/2010 | Tweedie |
| 2010/0237709 A1 | 9/2010 | Hall et al. |
| 2010/0313501 A1 | 12/2010 | Gangemi |
| 2011/0000535 A1 | 1/2011 | Davidson |
| 2011/0012430 A1 | 1/2011 | Cheng et al. |
| 2011/0017282 A1 | 1/2011 | Tas et al. |
| 2011/0037322 A1 | 2/2011 | Kanno |
| 2011/0041428 A1 | 2/2011 | Posnansky |
| 2011/0041518 A1 | 2/2011 | Peterson et al. |
| 2011/0047894 A1 | 3/2011 | Shadwell et al. |
| 2011/0214372 A1 | 9/2011 | Mullet et al. |
| 2011/0277408 A1 | 11/2011 | Turek et al. |
| 2012/0019074 A1 | 1/2012 | Frolov et al. |
| 2012/0024283 A1 | 2/2012 | Skillman |
| 2012/0098350 A1 | 4/2012 | Campanella et al. |
| 2012/0117908 A1 | 5/2012 | Turek et al. |
| 2012/0149291 A1* | 6/2012 | Roderick ............ F24F 11/0001 454/251 |
| 2013/0095293 A1 | 4/2013 | Boss et al. |
| 2013/0167463 A1 | 7/2013 | Duve |
| 2013/0193769 A1 | 8/2013 | Mehta et al. |
| 2013/0217318 A1* | 8/2013 | Edwards ................ E04D 13/17 454/366 |
| 2013/0233385 A1 | 9/2013 | Reese et al. |
| 2013/0255755 A1 | 10/2013 | Chich |
| 2013/0263534 A1 | 10/2013 | Railkar et al. |
| 2014/0090696 A1 | 4/2014 | Rodrigues et al. |
| 2014/0090697 A1 | 4/2014 | Rodrigues et al. |
| 2014/0190921 A1 | 7/2014 | Thomson et al. |
| 2014/0259998 A1 | 9/2014 | Railkar et al. |
| 2014/0259999 A1 | 9/2014 | Rodrigues et al. |
| 2014/0260001 A1 | 9/2014 | Kiik et al. |
| 2014/0265609 A1 | 9/2014 | Rodrigues et al. |
| 2015/0047285 A1 | 2/2015 | Dejarnette et al. |
| 2015/0125634 A1* | 5/2015 | Jefferson ............ C03B 23/0357 428/34 |
| 2015/0240495 A1 | 8/2015 | Vermilion et al. |
| 2017/0059184 A1* | 3/2017 | Haynes .................... F24S 20/69 |
| 2017/0355392 A1 | 12/2017 | Nagatani et al. |
| 2018/0123503 A1 | 5/2018 | Haynes et al. |
| 2018/0159462 A1* | 6/2018 | Vignal ..................... H02S 20/23 |

FOREIGN PATENT DOCUMENTS

| | | |
|---|---|---|
| CN | 1261417 A | 7/2000 |
| DE | 46673 C | 8/1888 |
| DE | 2002738 A1 | 7/1971 |
| DE | 42 16 171 A1 | 1/1993 |
| DE | 20 2005 002 105 | 6/2005 |
| DE | 10 2010 009 595 | 9/2011 |
| DE | 10 2010 019 815 A1 | 11/2011 |
| EP | 0 436 572 B1 | 11/1995 |
| EP | 2 009 704 | 12/2008 |
| EP | 2 075 389 A2 | 7/2009 |
| EP | 2 256 894 | 12/2010 |
| EP | 2 494 124 | 5/2014 |
| EP | 2 785 930 | 11/2015 |
| EP | 2 547 837 | 4/2017 |
| EP | 3227507 | 10/2017 |
| GB | 2 141 157 | 12/1984 |
| GB | 2 199 860 | 7/1988 |
| GB | 2 199 860 A | 7/1988 |
| GB | 2 344 836 | 8/2002 |
| GB | 2 344 836 A | 8/2002 |
| JP | S54-121515 | 9/1979 |
| JP | S6193750 | 5/1986 |
| JP | 56193750 U | 6/1986 |
| JP | S61-169562 A | 7/1986 |
| JP | S63-065240 | 3/1988 |
| JP | S63-165633 | 7/1988 |
| JP | H534623 A | 2/1993 |
| JP | H06-108549 | 4/1994 |
| JP | 06-212742 A | 8/1994 |
| JP | H7217011 | 8/1995 |
| JP | H7218002 | 8/1995 |
| JP | 08-068566 A | 3/1996 |
| JP | 09-032141 A | 2/1997 |
| JP | H960981 | 3/1997 |
| JP | h972618 | 3/1997 |
| JP | H09-275644 A | 10/1997 |
| JP | H11-136540 | 2/1999 |
| JP | 11-006231 A | 3/1999 |
| JP | 2001-295422 A | 10/2001 |
| JP | 2002-235955 | 8/2002 |
| JP | 2003-049509 | 2/2003 |
| JP | 2005-191578 A | 7/2005 |
| JP | 2006-022481 A | 1/2006 |
| JP | 2008-034557 A | 2/2008 |
| JP | 2008-180414 A | 8/2008 |
| JP | 2009-127921 | 6/2009 |
| JP | 2011-041464 A | 2/2011 |
| JP | 5118102 B2 | 1/2013 |
| JP | 2015-502726 | 1/2015 |
| JP | 60-060652 B2 | 1/2017 |
| JP | 2018-011504 | 1/2018 |
| KR | 20110128094 | 11/2011 |
| NZ | 715037 | 5/2013 |
| WO | WO-98/57009 | 12/1998 |
| WO | WO-00/23673 A1 | 4/2000 |
| WO | WO-02/093655 | 11/2002 |
| WO | WO-2006/063333 A2 | 6/2006 |
| WO | WO-2007/058548 | 5/2007 |
| WO | WO-2008/070907 A1 | 6/2008 |
| WO | WO-2008/137966 | 11/2008 |
| WO | WO-2010/036980 A1 | 4/2010 |
| WO | WO-2010/150316 | 12/2010 |
| WO | WO-2011/027627 A1 | 3/2011 |
| WO | WO-2011/099109 A1 | 8/2011 |
| WO | WO-2012/021145 | 2/2012 |
| WO | WO-2013/067484 A1 | 5/2013 |
| WO | WO-2013/081477 A1 | 6/2013 |
| WO | WO-2013/112248 | 8/2013 |
| WO | WO-2015/132756 | 9/2015 |

OTHER PUBLICATIONS

U.S. Appl. No. 15/651,300, filed Jul. 17, 2017, Zinniatek Limited.

ASTM D3462, Standard Specification for Asphalt Shingles Made from Glass Felt and Surfaced with Mineral Granules, downloaded Aug. 26, 2018, 4 pps.

Deck-ArmorTM Roof Protection (GAF Corp., Wayne, New Jersey), Updated Jul. 2018, 5 pps.

* cited by examiner

ROOFING, CLADDING OR SIDING MODULE OR APPARATUS

CROSS-REFERENCE TO RELATED APPLICATIONS

This Application claims the benefit of priority to international patent application number PCT/IB2017/056298, having a filing date of Oct. 12, 2017, which claims the benefit of U.S. Provisional Application No. 62/408,986, having a filing date of Oct. 17, 2016, the complete disclosures of which are hereby incorporated by reference for all purposes.

FIELD OF THE INVENTION

The present technology relates generally to roofing, cladding and/or siding products for providing a covering on a building surface.

BACKGROUND TO THE INVENTION

Environmental and sustainability concerns have created a need for alternative or renewable energy systems. Solar energy is one type of renewable energy source, and the sun's energy can be collected in a variety of different ways. One is converting solar energy into thermal energy to heat a fluid, such as air or water. Another is converting solar energy to electricity using photovoltaic cells. A properly sized and installed solar energy collection system can be a practical alternative for acquiring energy needs.

The disadvantages of traditional products for these purposes are that they are heavy and difficult to install, many do not have good durability and environmental resistance, and many are difficult to mass produce economically. Furthermore, traditional products may be attached to a roof surface using fasteners that penetrate a roof substrate such as roofing tiles or the like. Such fastener penetrations can compromise weather proofing of the roofing substrate.

Roofing and cladding surfaces tend to heat up over periods of exposure to sunlight, and the heat may then be transferred to the interior of the building. This can increase the expense of air conditioning and environmental control. Therefore, various methods of deflecting the heat, for example by providing reflective surfaces, are also known.

WO2015/132756 discloses a solar thermal control system 100 consisting of an outside cladding forming a cavity with an underlying support material of the building structure. The system is configured to collect heat from solar energy by extracting air from the cavity.

In this specification where reference has been made to patent specifications, other external documents, or other sources of information, this is generally for the purpose of providing a context for discussing the features of the invention. Unless specifically stated otherwise, reference to such external documents is not to be construed as an admission that such documents, or such sources of information, in any jurisdiction, are prior art, or form part of the common general knowledge in the art.

SUMMARY OF THE INVENTION

It is an object of the present invention to provide a roofing, cladding, or siding apparatus or roofing, cladding or siding components which will go at least some way towards addressing one or more of the foregoing problems or which will at least provide the public with a useful choice.

In a first aspect, the present invention consist in a roofing, cladding or siding module comprising:
an underlapping region adapted to be substantially covered by an exposed region of an adjacent overlapping module when installed on a building surface,
a plurality of projections formed on an underside of the underlapping region, wherein the projections:
(i) are feet to support the module on the building surface to provide a gap between the module and the building surface, and/or
(ii) provide a profile on the underside of the underlapping region to define a pathway for air flow between the module and the building surface,
each projection formed by a downwardly projecting portion of the underlapping region with a corresponding cavity in an upper side of the underlapping region,
wherein the cavity is shaped to prevent or minimize water pooling in the cavity.

In some embodiments, a surface of the cavity extending between a base (bottom) of the cavity and a front of the cavity is inclined to allow water to flow from the cavity when the module is located on an inclined building surface.

In some embodiments, each projection is a said foot and an angle between the surface of the cavity and a base of the foot is less than an angle of incline of the inclined building surface.

In some embodiments, each projection is a said foot and an angle between the surface of the cavity and a plane coterminous with bases of the feet is less than an angle of incline of the inclined building surface.

In some embodiments, with the module located on the building surface, an angle between the surface of the cavity and the building surface is less than an angle of incline of the inclined building surface.

In some embodiments, the angle of the surface of the cavity is less than 30 degrees, or less than 25 degrees, or less than 20 degrees, or less than 15 degrees, or is 10 degrees to 15 degrees.

In some embodiments, an angle of a surface of the cavity extending between a base of the cavity and a rear of the cavity is greater than an angle of the surface of the cavity extending between the base of the cavity and the front of the cavity.

In some embodiments, an angle between the surface of the cavity extending between the base of the cavity and a rear of the cavity and the surface extending between the base of the cavity and the front of the cavity is less than 120 degrees.

In some embodiments, the angle or angles is or are relative to a front-to-rear centerline of the cavity.

In some embodiments, the cavity reduces in width towards a front of the cavity to funnel water towards the front of the cavity.

In some embodiments, the cavity reduces in width between the base of the cavity and the front of the cavity.

In some embodiments, in plan-view the cavity is approximately teardrop shaped, a top of the teardrop shape forming the front of the cavity.

In some embodiments, each projection is a said foot and a base of the foot comprises a flat portion to bear against the building surface.

In some embodiments, a corresponding base of the cavity comprises a flat portion.

In some embodiments, the module comprises at least two rows of said projections, and wherein the rows are off-set or staggered between a front and rear of the underlapping region.

In some embodiments, the projections create a tortuous pathway for air flow between the building surface and the module.

In some embodiments, the module is a starter module for use at a lower edge of the building surface, the module to be substantially completely overlapped by an exposed region of an adjacent roofing, cladding or siding module.

In some embodiments, the module comprises an exposed region adapted to cover the underlapping region of an adjacent module when installed on the building surface.

In some embodiments, the upper surface of the exposed region comprises a photovoltaic cell or device.

In some embodiments, the module is adapted for use as part of a thermal energy recovery system.

In some embodiments, the module comprises:

a projection extending from the exposed region to provide a bearing surface facing the under surface of the exposed region, and one or more location details in the underlapping region each for receiving a clip comprising a tongue adapted to be received between the bearing surface and the under surface of the exposed region of an adjacent overlapping module when installed on a building surface.

In a second aspect, the present invention consists in a roofing, cladding, or siding apparatus comprising a roofing, cladding, or siding module as described in any one or more of the above statement, and one or more clips attachable to the underlapping region to provide a tongue adapted to be received between a bearing surface and the under surface of an exposed region of an adjacent overlapping module when installed on the building surface.

In a third aspect, the present invention consists in a system for removing or recovering thermal energy from a building surface, the system comprising:

a roofing, cladding, or siding assembly comprising a plurality of partially-overlapping modules that substantially covers the building surface, wherein each module is a module as described in any one or more of the above statements, and a fan adapted to induce the air flow.

In a fourth aspect, the present invention consists in a roofing, cladding or siding module comprising:

an underlapping region adapted to be substantially covered by an exposed region of an adjacent overlapping module when installed on a building surface, feet projecting from an underside of the underlapping region to provide a gap between the module and the building surface, each foot formed by a downwardly projecting portion of the underlapping region forming a corresponding cavity in an upper side of the underlapping region, wherein a surface of the cavity extending between a base of the cavity and a front of the cavity is inclined to allow water to flow from the cavity when the module is located on an inclined building surface, to prevent or minimize water pooling in the cavity.

Relative terms, such as "lower" or "bottom", "upper" or "top," and "front" or "back" may be used herein to describe one element's relationship to another element as illustrated in the Figures. It will be understood that relative terms are intended to encompass different orientations of the device in addition to the orientation depicted in the Figures. For example, if a device or apparatus in one of the figures is turned over, elements described as being on the "lower" side of other elements would then be oriented on "upper" sides of the other elements. The exemplary term "lower", therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Further, unless the context suggests otherwise, "front" is intended to be with respect to the 'front' of a roofing module that overlaps an adjacent roofing module that is lower down an inclined building surface.

As used herein, the term "building surface" refers to a wall surface or a top surface, etc. of a building, e.g. an exterior wall, a roof, a ceiling, etc., unless otherwise specified. In the context of a roof, the building surface typically comprises a waterproof roofing membrane attached to the roof deck adjacent an eave of the roof for preventing water damage to the roof deck and an interior of a building from wind-blown rain or water build-up on the roof. The roof deck is typically made of an underlying material, such as plywood. The waterproof membrane may be any of a number of waterproof roofing membranes known in the art such as but not limited to bituminous waterproof membranes, modified bituminous roofing membranes, self-adhering roofing membranes, or single ply waterproofing roofing membranes (e.g. EPDM waterproof roofing membranes, PVC waterproof roofing membranes, TPO waterproof roofing membranes). One exemplary membrane sheet is Deck-Armor™ Roof Protection, manufactured by GAF Corp., Wayne, N.J.

As used herein, the term "roofing" means a protective covering on the roof surface of a building. Without limitation, such a protective covering might take the form of shingles, tiles, panels, shakes, planks, boards, mouldings or sheets.

As used herein, the terms "cladding" and/or "siding" mean a protective covering on a side or other surface of a building. Without limitation, such a protective covering might take the form of shingles, tiles, panels, shakes, planks, boards, mouldings or sheets.

Without limitation a roofing, cladding and/or siding module that forms part of a roofing cladding or siding of a building may comprise one or more shingles, tiles, panels, shakes, planks, boards, mouldings or sheets or a portion of one of these. For example in some embodiments a cladding or siding module may be a weather board, and a roofing module may be a tile or shingle. In preferred embodiments a roofing, cladding or siding module is moulded from a polymeric material or materials (which may be in layers). Each moulded polymeric module preferably comprises a plurality of three or more dimensional profiled surfaces joined without weld lines or injection moulding points. Each profiled surface is a moulded segment along the length of the module. In some embodiments, each formed segment may correspond to an individual die or mold of a continuous forming machine. In some embodiments, the one or more polymeric materials are selected from the group consisting of polycarbonate, foamed polycarbonate, thermoplastic polyurethane (TPU), thermoplastic olefin (TPO), polyvinyl chloride (PVC), acrylonitrile butadiene Styrene (ABS), Styrene-acrylonitrile resin (SAN), thermoplastic rubber, and any other amorphous or crystalline polymer or combination of polymers. In some embodiments, the one or more polymeric materials are flame retardant. In some embodiments, the one or more polymeric materials are weather, hail, ultraviolet, tear, mold and impact resistant. In other embodiments a roofing, cladding or siding module may be formed from metals, composites, fibre cement, fibreglass, concrete, clay, wood and/or asphalt.

As used herein, the terms "profiled" and/or "contoured" mean having a region, or regions which extend above or below a notional planar surface lying along the longitudinal axis of the product. This includes profiling or contouring of only one upper or lower surface, and/or profiling or contouring of an entire thickness of material such that the upper and lower surfaces have the same relative degree of extension above or below the notional planar surface.

As used herein, the term "polymer" (and associated terms such as "polymeric") includes polymers, polymer blends, and polymers with or without additive inclusions.

The term "comprising" as used in this specification and claims means "consisting at least in part of". When interpreting each statement in this specification and claims that includes the term "comprising", features other than that or those prefaced by the term may also be present. Related terms such as "comprise" and "comprises" are to be interpreted in the same manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

Unless otherwise stated, the singular forms "a," "an," and "the" include the plural reference. For example, a reference to "a device" includes a plurality of devices.

As used herein the term "and/or" means "and" or "or", or both.

As used herein "(s)" following a noun means the plural and/or singular forms of the noun.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

The invention consists in the foregoing and also envisages constructions of which the following gives examples only.

BRIEF DESCRIPTION OF THE DRAWINGS

Preferred embodiments of the invention will be described by way of example only and with reference to the drawings, in which:

FIG. 2A shows a top perspective view, FIG. 2B bottom perspective view, FIG. 2C top view, FIG. 2D bottom view, and FIG. 2E a rear view.

DETAILED DESCRIPTION OF PREFERRED EMBODIMENTS

Figure 1:
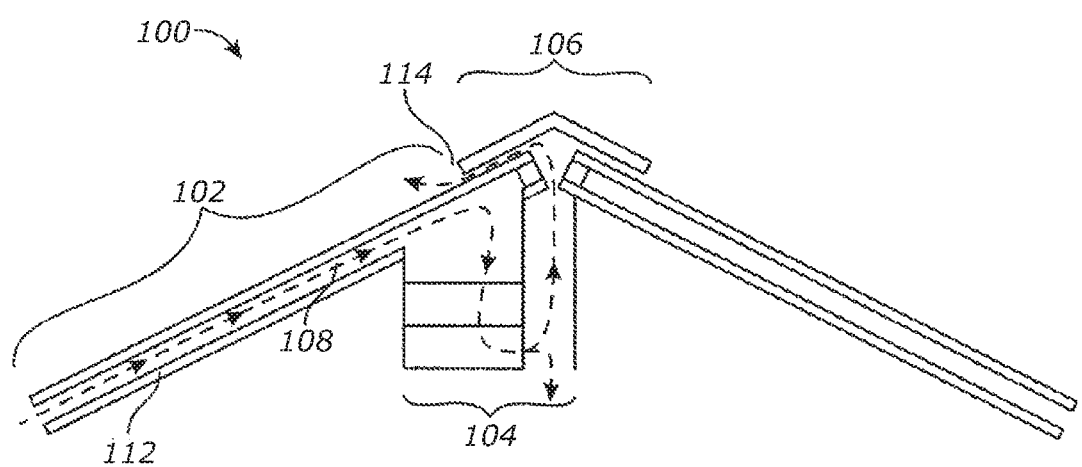
FIG. 1 is a schematic illustration of a solar thermal system.

A solar thermal system is shown in FIG. 1 as a roof installation. However, solar thermal system comprising a cladding or external membrane may be mounted or coupled to any underlying support material (e.g., a wall, a roof, etc.) of a building or structure in order to collect solar energy at the structure.

The solar thermal system may include a solar collector consisting of an outside cladding or external membrane (e.g., one or more roofing modules) forming a cavity with the underlying support material of the building structure. The system is configured to collect heat from solar energy by extracting air from the cavity. The solar thermal system also includes a thermal collection unit (e.g., a thermal box) that may be mounted underneath the external membrane and connected to the cavity to collect and direct air flow from the cavity. The system may also include ducts (i.e., a ducting system) to direct the flow of air within the solar thermal system. The system described herein offers an additional benefit of providing building efficiency (e.g., energy efficiency) by way of reducing thermal load into the building or other associated structure during warm seasons and reducing the escape of thermal energy produced within the building or other structure during cold seasons.

Figure 3:
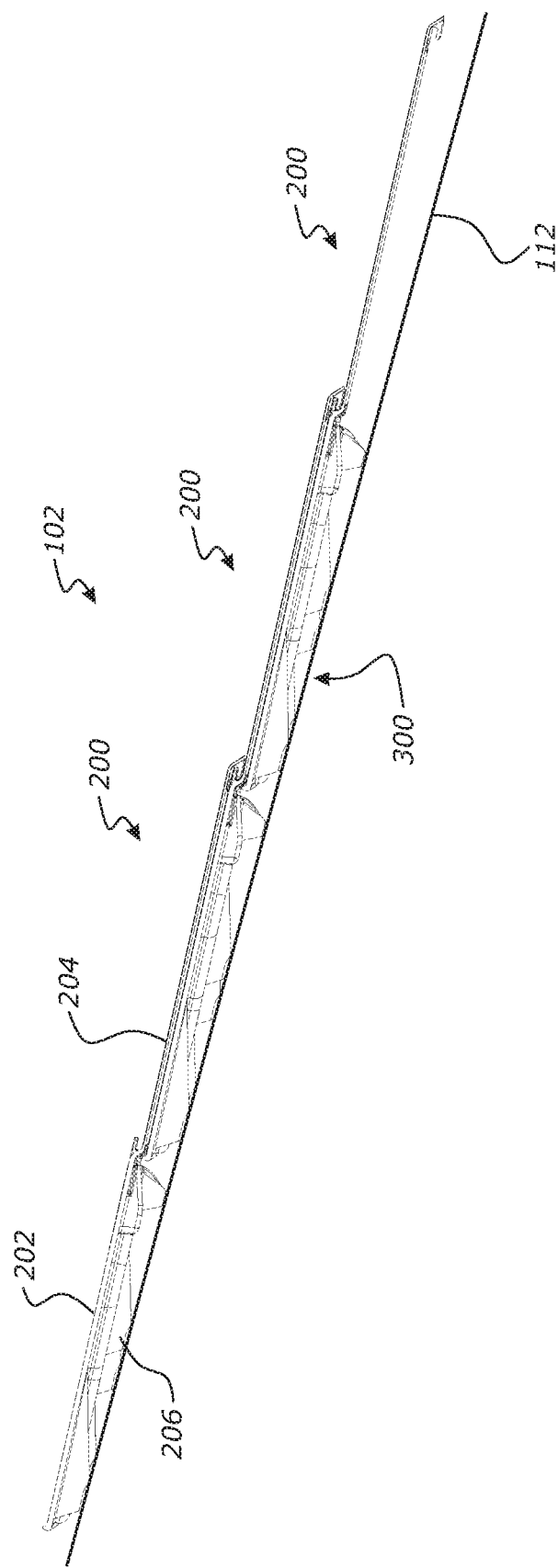
FIG. 3 is a side view of a number of overlapping roofing modules to form a roof or roofing membrane.

Referring to FIG. 1, a solar thermal control system 100 is shown. The system 100 may be configured to form an outermost (e.g., topmost) surface of a building or other structure. The system 100 includes a roofing membrane 102 configured to cover underlying support material 112 (e.g., building paper, plywood, dry wall, etc.) of an associated building. The roofing membrane 102 may be at least partially made from a weatherproofing material in order to protect the structure from the elements, including the underlying material 112. The outermost surface of the roofing membrane 102 may be made from a material configured to absorb sunlight, such as a solar panel. In an exemplary embodiment, the roofing membrane 102 is made from a plurality of overlapping sections (e.g., roofing modules, tiles, shingles, etc.), as shown in FIG. 3.

The roofing membrane 102 is configured to form a cavity 108 for air to flow between the membrane 102 and the underlying material 112. In an exemplary embodiment, the air within the cavity 108 is heated by the sunlight (i.e., the solar energy) captured by the roofing membrane 102. The hot air is drawn from the cavity 108 into a thermal collection unit shown as a box 104. An exemplary path for the hot air is illustrated by the arrows of FIG. 1. The box 104 is fluidly connected to the cavity 108 and configured to receive the hot air from the cavity 108.

From the thermal collection unit 104, the air is either routed into the building (down according to FIG. 1) to be used to heat water or the environment within the building or the air is exhausted into the outside air via a vented ridge 106 of the system 100. Air may also be otherwise vented from the building in this or other embodiments (e.g., via a duct to an exterior wall such as a gable end). The vented ridge 106 is configured to cover a portion of the roofing membrane 102 and provides at least one extraction point shown as opening 114 for excess hot air to be exhausted from the system 100 (e.g., from the box 104). The system 100 may include any number of extraction points (e.g., openings, exhaust areas, etc.) in other embodiments. The number of extraction points may depend on the size and/or shape of the roof or the associated building and/or a particular application of the thermal control system 100. A fan may be provided to draw or push air up the cavity, and/or from the box 104.

Referring now to FIGS. 2A to 2E, a roofing, cladding or siding apparatus 20 is shown. In this embodiment, two or more roofing apparatuses 20 may be combined (e.g., coupled, stacked, overlapped, etc.) to form the roofing membrane 102 or another similar outside cladding or covering for the system 100, as shown in FIG. 3. Each roofing, cladding or siding apparatus comprises a roofing, cladding or siding module 200. Each module 200 includes an underlapping section 202 (e.g., bottom section, under section, etc.) and an overlapping section 204 (e.g., top section, over section, etc.). The sections 202 and 204 may be made from similar material, and preferably are integrally formed as a single unitary member. In an exemplary embodiment, the sections 202 and 204 have similar dimensions, including a similar area, such that the sections 202 and 204 overlap to form the membrane 102.

Each module may be fixed to a building surface such as a roof surface by fasteners (nail or screw for example) applied through the module in the underlapping region or fixing region of the module. Preferably the fasteners are applied through the underlapping region so that the fasteners do not penetrate the exposed overlapping region of the module, thereby making the roofing, cladding or siding apparatus less likely to leak. In some embodiments the underlapping region may be pre-formed with fastener holes or may include markings for locating or supporting fasteners for penetrating the module.

Preferably the exposed region of the module is also secured to the building surface to ensure the module is properly secured to the building. Preferably a front edge or front edge portion of the exposed region is secured to the building surface to prevent damage to the module caused by wind lifting a front edge of the module off or away from an underlying module.

To secure the exposed region of the module to a building surface, the roofing, cladding or siding apparatus according to some embodiments comprises one or more clips 208. Each clip 208 secures the exposed region 204 of an adjacent overlapping module 200 to the underlapping module 200. Each clip may be located within a location detail on the underlapping region 202. As the underlapping module is secured to the building surface, the exposed region 204 of the overlapping module is secured to the building surface via the underlapping module. In some embodiments, the clip is secured to the building surface by a fastener (e.g. a nail or screw, not shown) extending through the underlapping section 202 of an underlapping module, the exposed region 204 of an overlapping module secured to the building surface by the clip 208 and fastener extending through the underlapping module. Thus the fastener and clip secure an underlapping module and an overlapping module to the building surface at a single location of the building surface.

Figure 4:
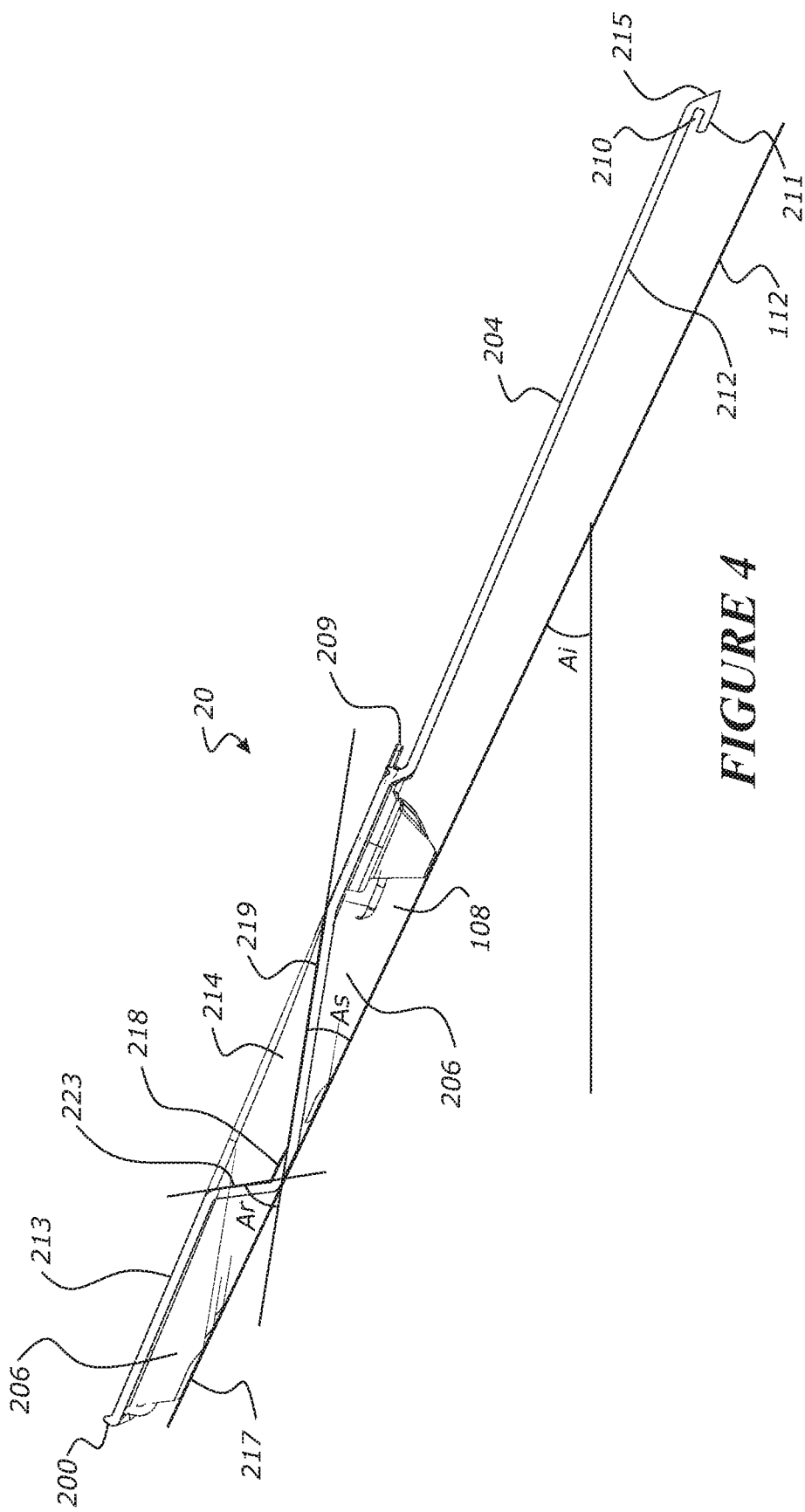
FIG. 4 is a cross sectional side view of the roofing module and clip of FIGS. 2A to 2C.

As best shown in FIG. 4, each clip 208 provides a tongue 209 to be received in a corresponding groove 210 of the exposed region 204 of an adjacent overlapping module 200. In some embodiments the module comprises a projection or lip 211 extending rearward from the under surface of the exposed region 202. The lip 211 provides a groove or channel 210 between the lip 211 and the under surface 212 of the exposed region 204. In some embodiments the groove or channel 210 is open towards the rear of the module for receiving the forwardly extending tongue 209 of a clip 208.

Figure 5:
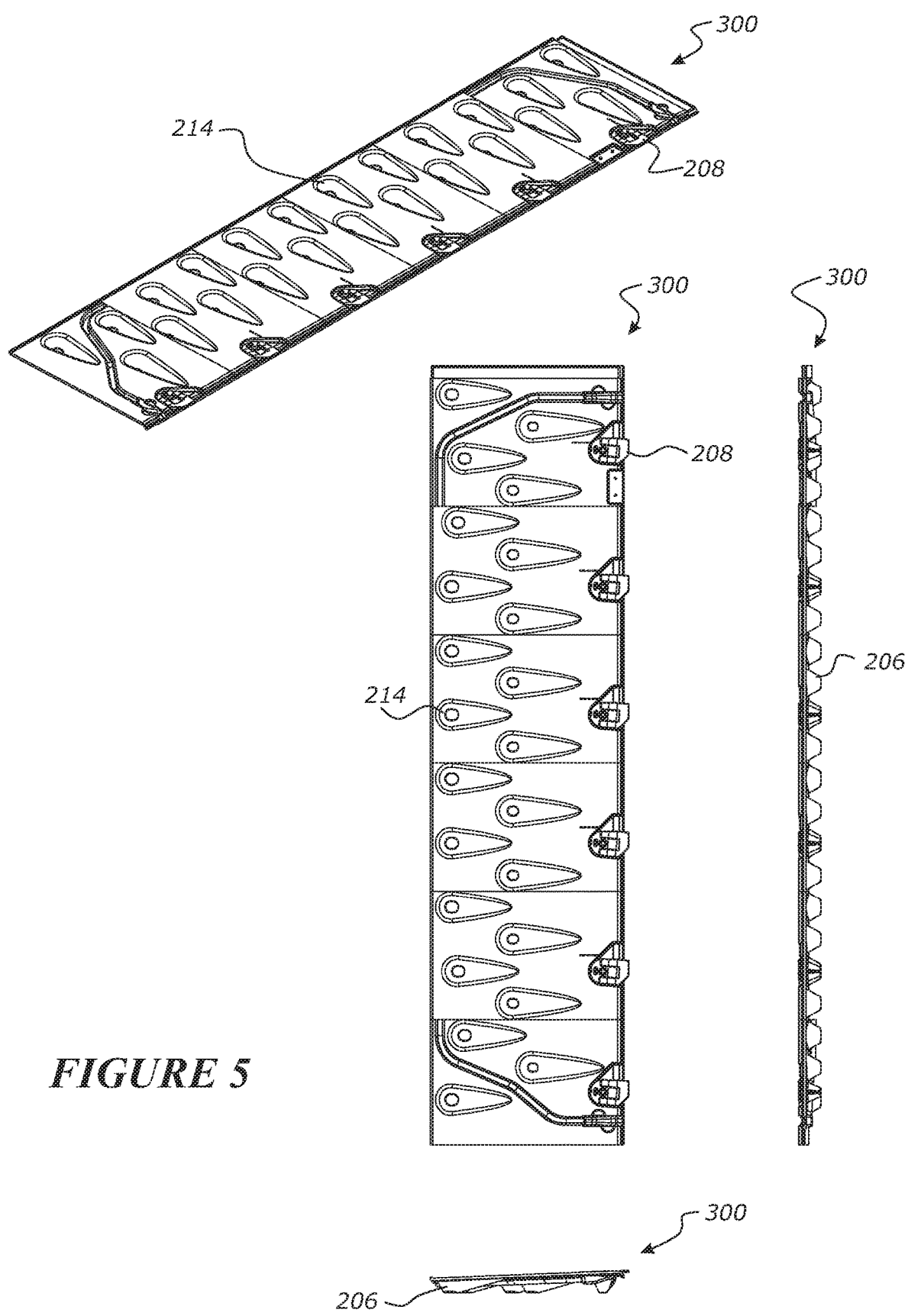
FIG. 5 shows various views of a 'starter' module with clips, for securing an overlapping module at a lower edge of a building surface.

For securing a module 200 to a building surface, a 'starter module' may be provided that has an underlapping region 202 and no overlapping region. A starter module 300 is illustrated in FIG. 5. The starter module 300 may be fixed to a building surface 112, for example a roofing surface, at a lower edge of the surface 112. A module 200 in a next row of modules up the building surface is applied with its overlapping section 204 overlapping the starter module 300, and with its front edge 215 secured to the starter module via clips 208.

The underlapping section 202 of the module 200, 300 includes projections 206. Some of the projections may form feet 206 configured to rest on the underlying material 112 (or another outer surface) of the associated building, raising the remainder of the underlapping section 202 a distance above the underlying material 112. When the feet 206 rest on the underlying material 112, the cavity 108 is formed between the underlapping section 202 and the underlying material 112 (i.e., around or between the feet 206).

The height of the projections 206 may be related to an intended air flow through the cavity 108, with a greater height leading to a greater air flow. In an exemplary embodiment, the projections 206 are sized and shaped to provide an approximately 20 millimetre air gap between the roofing module 200 and the underlying material 112 (e.g., wherein the feet 206 and/or the cavity have a height of approximately twenty millimetres). The air gap (e.g., the cavity 108) is intended to allow air to be drawn from either a section (e.g., a roofing module 200) or the whole roof (e.g., the membrane 102) to a centrally located thermal collection unit (e.g., box 104). However, the roof of a building structure may contain a plurality of collection units to optimize thermal energy harvest. For example, solar thermal energy may be collected from a first roof surface and directed (e.g., via a system of ducts and dampers) to a second roof surface to melt snow on the second roof surface. In another embodiment, a first roof surface or section of roof surfaces may be utilized for water heating and a second roof surfaces or section of roof surfaces may be utilized for space heating.

Figure 2A:
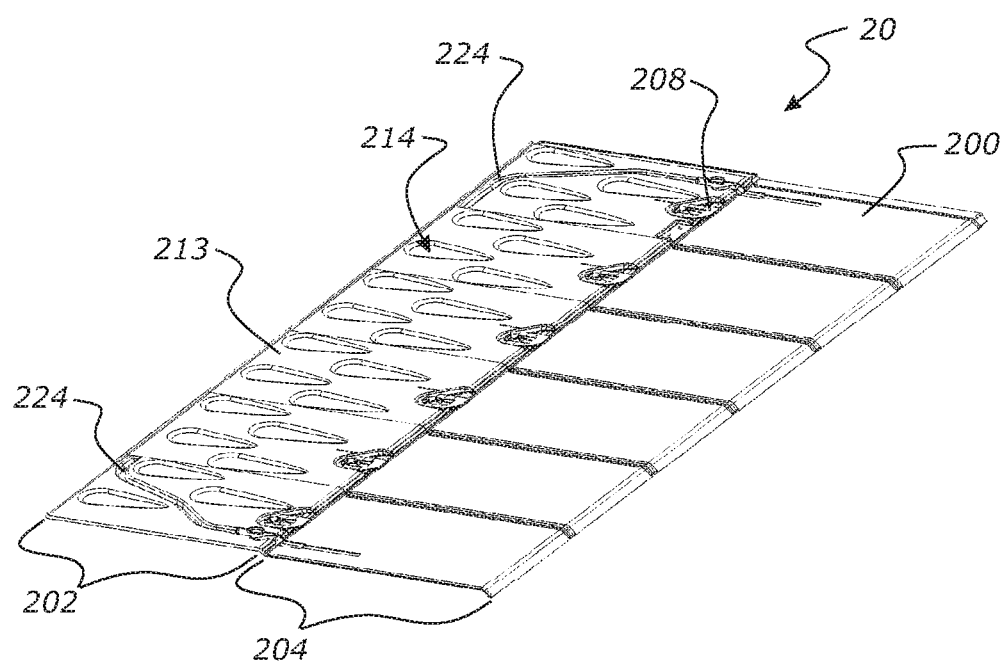
FIGS. 2A to 2E show a roofing apparatus comprising a roofing module with clips for securing a front edge of an overlapping module.
Figure 2B:
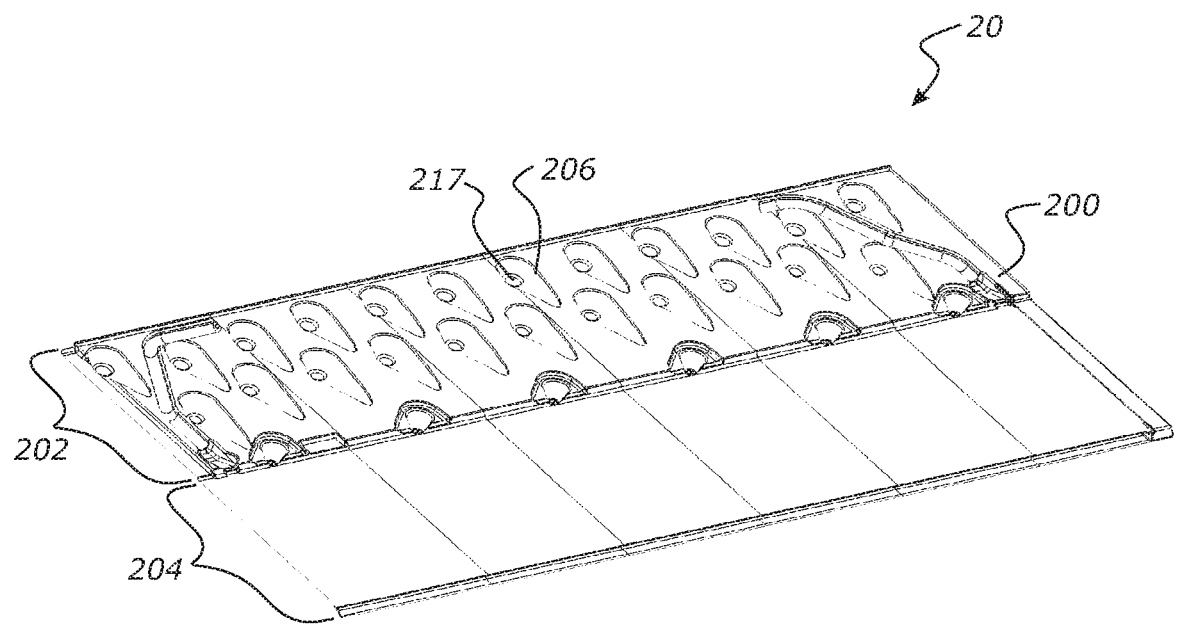
Figure 2C:
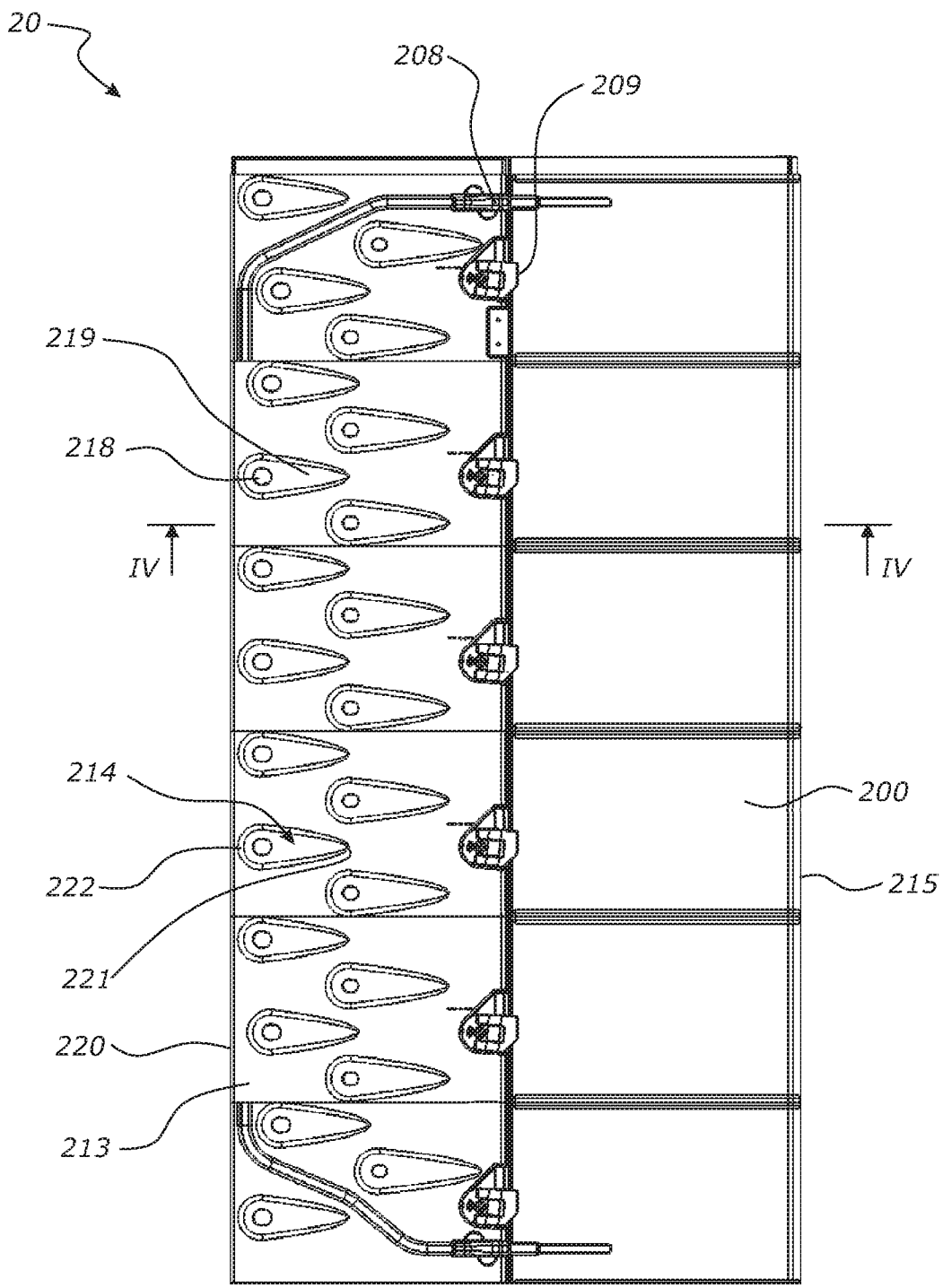
Figure 2D:
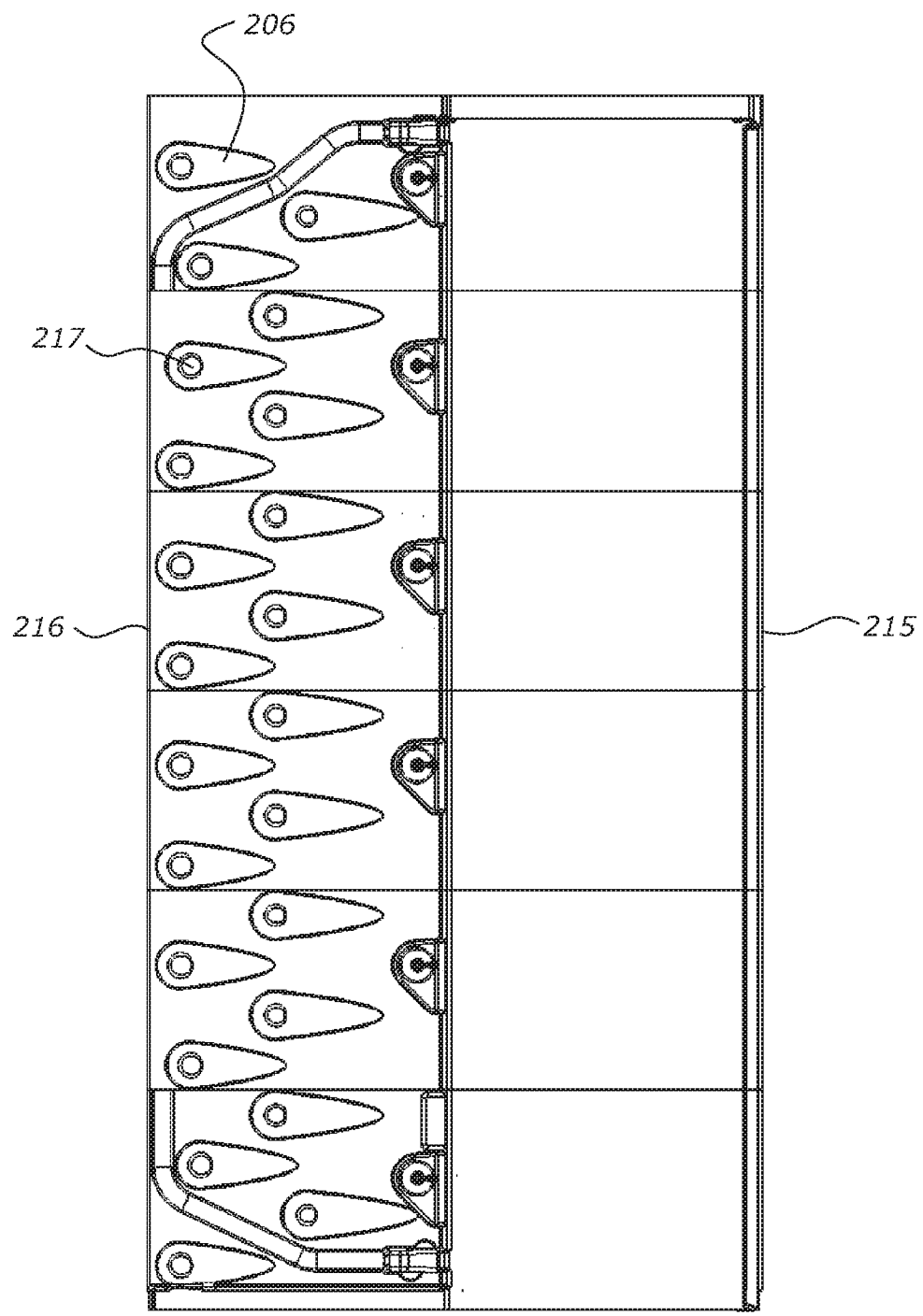
Figure 2E:
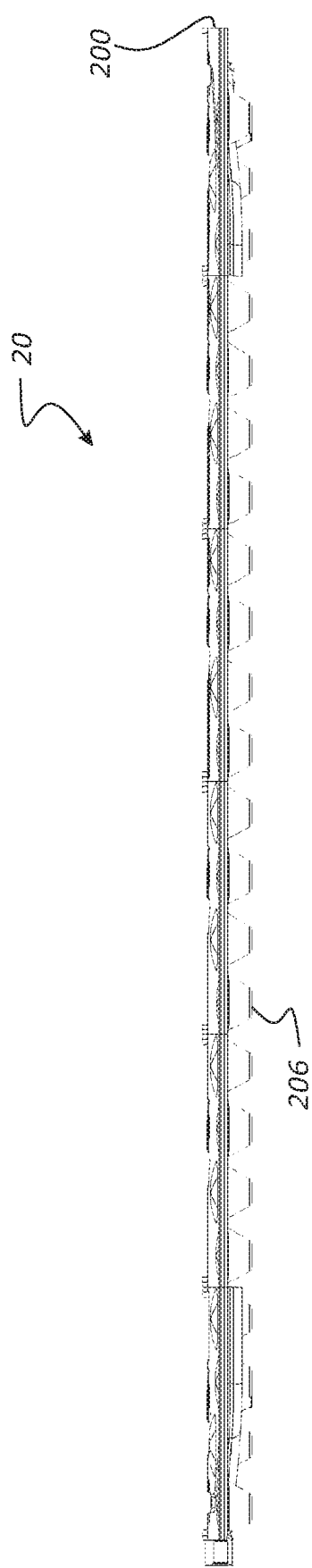

In some embodiments, some of the projections 206 may not act as feet, but may be provided to disrupt or direct air flow through the cavity. For example, some projections 206 may act as feet and also as projections for directing air flow, and some projections 206 may provide for directing air flow only, without supporting the module 200 from the building surface. In some embodiments, as best illustrated in FIGS. 2C and 2D the projections 206 may be provided in rows that are staggered, to provide a tortuous pathway for the air flow up the cavity between the building surface and membrane.

The underlapping section 202 may include any number of projections 206 as is suitable for the particular application of the system 100. For instance, the underlapping section 202 may include less projections 206 if a greater air flow is required through the cavity 108 (i.e., to create more air space within the cavity 108). The underlapping section 202 may also include more projections 206 if the roofing modules 200 are made from a particularly heavy material (i.e., to support the weight of the projections 200) or are to be positioned in a relatively high foot-traffic area of the roof (e.g., to support the weight of any service personnel or other persons on the roof). The projections 206 may be approximately equally spaced across the underlapping section 202 in order to raise the underlapping section 202 an appropriate distance above the underlying material 112 and create the cavity 108.

Each projection 206 is formed by a downwardly projecting portion of the underlapping region 202 with a corresponding cavity 214 in an upper side 213 of the underlapping region 202. If there were to be any water reaching between the exposed region 204 of an overlapping region and the under lapping region of an underlapping module, for example in extreme weather conditions whereby water may be directed upwards up a roofing surface, the water may collect or pool in the cavities in the upper surface of the module. Therefore, according to the present invention, each cavity is shaped to prevent or minimize water pooling in the cavity. As shown in FIG. 3, the roofing membrane 102 is particularly configured for a slanted or angled roof (relative to the horizon). Each cavity is preferably shaped to prevent or minimum water pooling in the cavity for a particular angle of inclination of the building surface. Where the module is positioned at an angle with the front 215 of the module below the rear 220 of the module, the cavity is shaped so that water drains or runs from the cavity towards the front of the module.

With reference to FIG. 4, the cavity 214 has a base or bottom 218. The depth of the cavity is greatest at the base or bottom of the cavity. According to some embodiments, a surface 219 of the cavity that extends between the base 218 of the cavity and a front of the cavity is inclined to allow water to flow from the cavity when the module is located on an inclined building surface. A projection 206 that forms a foot for supporting the module 200 from a building surface 112 comprises a bottom or a base 217 that contacts the building surface. The base 217 of the foot 206 preferably comprises a flat portion to bear against the building surface 112. The base 218 of the cavity may be correspondingly flat. In some embodiments, an angle $A_s$ between the surface 219 of the cavity 214 and the base 217 of the foot is less than an angle of incline $A_i$ of the inclined building surface 112 (with respect to the horizon), so that water drains from the cavity 214 towards a front 215 of the module. The bases 217 of the plurality of feet 206 are coterminous on a plane, so that they all contact the building surface 112 to support the module. An angle $A_s$ between the surface 219 of the cavity 214 and the plane coterminous with the bases 217 of the feet is less than the angle of incline $A_i$ of the inclined building surface. With the module 200 located on the inclined building surface 112, an angle $A_s$ between the surface 219 of the cavity and the building surface 112 is less than the angle of incline $A_i$ of the inclined building surface. In some embodiments the angle $A_s$ described above is less than 30 degrees, or less than 25 degrees, or less than 20 degrees, or less than 15 degrees, or is 10 degrees to 15 degrees. For example, an angle $A_s$ of less than 15 degrees allows for a minimum roof angle of incline $A_i$ of 15 degrees to allow water to drain from the cavity. In one embodiment the angle $A_s$ is about 11 degrees.

In some embodiments, an angle $A_r$ of a surface 223 of the cavity 214 extending between the base 218 of the cavity 214 and a rear 222 (FIG. 2C) of the cavity is greater than the angle $A_S$ of the surface 219 of the cavity extending between the base 218 of the cavity and the front 221 (FIG. 2C) of the cavity. In some embodiments, an angle between the surface 223 of the cavity extending between the base 218 of the cavity and the rear 222 of the cavity and the surface 219 extending between the base 218 of the cavity and the front 221 of the cavity is less than 120 degrees.

The cross section of FIG. 4 is taken on a centreline of one of the cavities 214. The angles $A_s$ and $A_r$ described above may therefore be relative to a front-to-rear centreline of the cavity.

As best shown in the plan view of FIG. 2C, in some embodiments the cavity 214 reduces in width towards a front of the cavity, so that the cavity funnels water towards the front 221 of the cavity. The cavity reduces in width between the base 218 of the cavity 214 and the front 221 of the cavity. As shown, in some embodiments the cavity is approximately teardrop shaped in plan view, a top 221 of the teardrop shape forming the front 221 of the cavity 214.

In some embodiments, the module 200 may be adapted for use in a system to generate electrical energy from solar power. Such products are generally referred to as building integrated photovoltaic products ("BIPV"). A series or array of photovoltaic cells may be carried on the exposed region 204 of the module 200 so that they capture photons when installed on a building surface 112. For example, an energy generating module may comprise one or more moulded material layers, a solar array layer of connected photovoltaic cells, and an optional transparent surface laminate layer. The energy generating module may also comprise bonding/encapsulation/tie layers to the front and/or back of the PV layer and may also contain layers to stop the corrosion of the PV layer e.g. polyethylene, EFTE, etc. The photovoltaic cells installed on a module may be arranged in a row and connected via two bus strips extending the entire length of the module; one running across the upper edges of the cells and one running across the lower edges so that only a single electrical junction for each module need be connected to a main power take-off on installation. A further option is to have a bus strip material integrally moulded into the module during the forming process. The modules may be molded to accommodate various components of the photovoltaic system. For example, as shown in FIG. 2A, the upper surface of the underlapping region may include channels 224 configured to receive cables or wires of the photovoltaic array. Moreover, the upper surface of the underlapping region may also include formed cavities configured to receive junction boxes, printed circuit boards (PCB), communication devices, cables, wires, buses, components, cells, or diodes, and the like of the photovoltaic array. Thus, the modules may contain all of the hardware and software required to connect and regulate the PV cells. Example thermal energy recovery modules and modules comprising an array of solar cells for electrical energy generation, and methods for the continuous forming process for manufacturing such modules are described in WO2013/081477, the contents of which is hereby incorporated by reference.

The foregoing description of the invention includes preferred forms thereof. Modifications may be made thereto without departing from the scope of the invention.

The invention claimed is:

1. A roofing, cladding or siding module comprising:
    an underlapping region adapted to be substantially covered by an exposed region of an adjacent overlapping module when installed on an inclined building surface,
    a plurality of projections formed on an underside of the underlapping region, wherein the projections:
        (i) are feet to support the module on the inclined building surface to provide a gap between the module and the inclined building surface, and/or
        (ii) provide a profile on the underside of the underlapping region to define a pathway for air flow between the module and the inclined building surface,
    each projection formed by a downwardly projecting portion of the underlapping region with a corresponding cavity in an upper side of the underlapping region,
    wherein the cavity is shaped to prevent or minimize water pooling in the cavity,
    wherein a surface of the cavity extending between a base of the cavity and a front of the cavity is inclined to allow water to flow from the cavity when the module is located on the inclined building surface, and wherein with the module located on the inclined building surface, an angle between the surface of the cavity extending between the base of the cavity and the front of the cavity and the inclined building surface is less than an angle of incline of the inclined building surface.

2. A module as claimed in claim 1, wherein each projection is a foot and an angle between the surface of the cavity extending between the base of the cavity and the front of the cavity and a base of the foot is less than the angle of incline of the inclined building surface.

3. A module as claimed in claim 1, wherein each projection is a foot and an angle between the surface of the cavity extending between the base of the cavity and the front of the cavity and a plane coterminous with bases of the feet is less than the angle of incline of the inclined building surface.

4. A module as claimed in claim 1, wherein the angle between the surface of the cavity extending between the base of the cavity and the front of the cavity and the inclined building surface is less than 30 degrees, or less than 25 degrees, or less than 20 degrees, or less than 15 degrees, or is 10 degrees to 15 degrees.

5. A module as claimed in claim 1, wherein an angle of a surface of the cavity extending between the base of the cavity and a rear of the cavity is greater than the angle of the surface of the cavity extending between the base of the cavity and the front of the cavity.

6. A module as claimed in claim 5, wherein an angle between the surface of the cavity extending between the base of the cavity and the rear of the cavity and the surface extending between the base of the cavity and the front of the cavity is less than 120 degrees.

7. A module as claimed in claim 6, wherein the angle between the surface of the cavity extending between the base of the cavity and the front of the cavity and the inclined building surface is relative to a front-to-rear centerline of the cavity, the angle of the surface of the cavity extending between the base of the cavity and the rear of the cavity is relative to the front-to-rear centerline of the cavity, and the angle between the surface of the cavity extending between the base of the cavity and the rear of the cavity and the surface extending between the base of the cavity and the front of the cavity is relative to the front-to-rear centerline of the cavity.

8. A module as claimed in claim 1, wherein the cavity reduces in width towards the front of the cavity to funnel water towards the front of the cavity.

9. A module as claimed in claim 8, wherein the cavity reduces in width between the base of the cavity and the front of the cavity.

10. A module as claimed in claim 1, wherein in plan-view the cavity is approximately teardrop shaped, a top of the teardrop shape forming the front of the cavity.

11. A module as claimed in claim 1, wherein each projection is a foot and a base of the foot comprises a flat portion to bear against the inclined building surface.

12. A module as claimed in claim 11, wherein a corresponding base of the cavity comprises a flat portion.

13. A module as claimed in claim 1, wherein the module comprises at least two rows of said projections, and wherein the rows are off-set or staggered between a front and rear of the underlapping region.

14. The module as claimed in claim 1, wherein the projections create a tortuous pathway for air flow between the inclined building surface and the module.

15. A module as claimed in claim 1, wherein the module is a starter module for use at a lower edge of the inclined building surface, the module to be substantially completely overlapped by an exposed region of an adjacent roofing, cladding or siding module.

16. A module as claimed in claim 1, wherein the module comprises an exposed region adapted to cover the underlapping region of an adjacent module when installed on the inclined building surface.

17. A module as claimed in claim 16, wherein the upper surface of the exposed region comprises a photovoltaic cell or device.

18. A module as claimed in claim 16, comprising:
a projection extending from the exposed region to provide a bearing surface facing the under surface of the exposed region, and
one or more location details in the underlapping region each for receiving a clip comprising a tongue adapted to be received between the bearing surface and the under surface of the exposed region of an adjacent overlapping module when installed on the inclined building surface.

19. A module as claimed in claim 1, wherein the module is adapted for use as part of a thermal energy recovery system.

20. A roofing, cladding, or siding apparatus comprising a roofing, cladding, or siding module as claimed in claim 1, the apparatus comprising:
one or more clips attachable to the underlapping region to provide a tongue adapted to be received between a bearing surface and the under surface of an exposed region of an adjacent overlapping module when installed on the inclined building surface.

21. A system for removing or recovering thermal energy from a building surface, the system comprising:
a roofing, cladding, or siding assembly comprising a plurality of partially-overlapping modules that substantially covers the building surface, wherein each module is a module as claimed in claim 1.

22. A roofing, cladding or siding module comprising:
an underlapping region adapted to be substantially covered by an exposed region of an adjacent overlapping module when installed on a building surface, and
feet projecting from an underside of the underlapping region to provide a gap between the module and the building surface, each foot formed by a downwardly projecting portion of the underlapping region forming a corresponding cavity in an upper side of the underlapping region,
wherein a surface of the cavity extending between a base of the cavity and a front of the cavity is inclined to allow water to flow from the cavity when the module is located on the building surface, to prevent or minimize water pooling in the cavity, and
wherein with the module located on the building surface, an angle between the surface of the cavity and the building surface is less than an angle of incline of the building surface.

23. A module as claimed in claim 22, wherein an angle between the surface of the cavity and a base of each of the feet is less than the angle of incline of the building surface.

24. A module as claimed in claim 22, wherein an angle between the surface of the cavity and a plane coterminous with bases of the feet is less than the angle of incline of the building surface.

25. A module as claimed in claim 22, wherein the angle between the surface of the cavity and the building surface is less than 30 degrees, or less than 25 degrees, or less than 20 degrees, or less than 15 degrees, or is 10 degrees to 15 degrees.

26. A module as claimed in claim 22, wherein an angle of a surface of the cavity extending between the base of the cavity and a rear of the cavity is greater than the angle of the surface of the cavity extending between the base of the cavity and the front of the cavity.

27. A module as claimed in claim 26, wherein an angle between the surface of the cavity extending between the base of the cavity and the rear of the cavity and the surface extending between the base of the cavity and the front of the cavity is less than 120 degrees.

* * * * *